US010721881B1

(12) United States Patent
Fischman

(10) Patent No.: US 10,721,881 B1
(45) Date of Patent: Jul. 28, 2020

(54) SYSTEM AND METHOD FOR END GUN CONTROL AND COMPENSATION

(71) Applicant: Valmont Industries, Inc., Omaha, NE (US)

(72) Inventor: Kevin K. Fischman, Elkhorn, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/039,642

(22) Filed: Jul. 19, 2018

Related U.S. Application Data

(60) Provisional application No. 62/537,026, filed on Jul. 26, 2017.

(51) Int. Cl.
| | | |
|---|---|---|
| *A01G 25/16* | (2006.01) | |
| *A01G 25/09* | (2006.01) | |
| *G05B 13/02* | (2006.01) | |
| *G01W 1/02* | (2006.01) | |
| *G05D 13/62* | (2006.01) | |
| *G05D 16/20* | (2006.01) | |

(52) U.S. Cl.
CPC ......... *A01G 25/167* (2013.01); *A01G 25/092* (2013.01); *G05B 13/024* (2013.01); *G01W 1/02* (2013.01); *G05D 13/62* (2013.01); *G05D 16/20* (2013.01)

(58) Field of Classification Search
CPC ....... A01G 25/00; A01G 25/092; A01G 25/16
See application file for complete search history.

(56) References Cited

U.S. PATENT DOCUMENTS

| | | | | |
|---|---|---|---|---|
| 3,667,673 A | * | 6/1972 | Knudsen | A01G 25/16 239/1 |
| 4,128,205 A | | 12/1978 | Coash | |
| 4,411,386 A | * | 10/1983 | Disbrow | A01G 25/092 239/728 |
| RE31,838 E | | 2/1985 | Seckler et al. | |
| 5,341,995 A | | 8/1994 | Leatch | |
| 6,108,590 A | | 8/2000 | Hergert | |
| 6,290,151 B1 | | 9/2001 | Barker et al. | |
| 6,938,842 B2 | | 9/2005 | Choat et al. | |
| 7,953,550 B1 | | 5/2011 | Weiting | |
| 9,363,956 B1 | * | 6/2016 | Standley | A01G 25/092 |
| 2004/0089735 A1 | * | 5/2004 | Drechsel | A01G 25/09 239/195 |
| 2012/0221154 A1 | | 8/2012 | Runge | |
| 2013/0008977 A1 | | 1/2013 | Pfrenger et al. | |
| 2013/0090772 A1 | | 4/2013 | Pfrenger | |
| 2013/0297083 A1 | | 11/2013 | Pfrenger et al. | |
| 2016/0158783 A1 | * | 6/2016 | Wiebe | A01G 25/165 700/284 |
| 2017/0127625 A1 | * | 5/2017 | Hattar | A01G 25/16 |

* cited by examiner

*Primary Examiner* — Mark A Connolly
(74) *Attorney, Agent, or Firm* — Milligan PC LLC

(57) ABSTRACT

The present invention provides a system and method which combines field mapping and control software to effectively manage end gun parameters to adjust for changes in weather conditions and positional/terrain changes. According to a first preferred embodiment, the present invention preferably provides a system which monitors a mapped set of boundaries and preferably receives data regarding a variety of weather factors including wind monitoring (speed, direction, averages, and gusts) and preferably makes adjustments to the system to adjust and modify the shape of a desired distribution area based on the weather factors.

11 Claims, 3 Drawing Sheets

SYSTEM AND METHOD FOR END GUN CONTROL AND COMPENSATION

RELATED APPLICATION

The present application claims priority to U.S. Provisional Application No. 62/537,026 filed Jul. 26, 2017.

FIELD OF THE PRESENT INVENTION

The present invention relates generally to a system and method for irrigation management and, more particularly, to a system and method for controlling the status of an irrigation system in response to weather conditions.

BACKGROUND OF THE INVENTION

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. Optionally, end guns may be attached to the end of any irrigation span to add further coverage. In use, end guns can greatly extend the reach and range of an irrigation system.

End guns operate at a given trajectory and over specific angles (i.e. half circle, full circle). Commonly, end guns are heavy duty impact sprinklers which include controllable valves to control the flow rate of the end gun. They may also include pressure boosting systems to extend the range of the end gun.

Current end gun designs employ a fixed nozzle to provide for a specific distance of throw and pattern. This creates a defined distance, area and pattern that they can effectively cover. This also creates fixed locations where the end gun can run without spraying outside of a given boundary. Due to the set distance of throw with current end guns, they cannot be turned on until they are far enough away from the boundary that they will not throw out of the boundary. Not only is this a loss of product but in some areas it can result in a fine or penalty. The problem is further complicated by the fact that wind conditions and other weather factors can greatly affect whether a desired distribution pattern actually falls within a given boundary or whether it misses areas inside of the boundary.

In order to overcome the limitations of the prior art, a system is needed which is able to monitor and adjust end gun distribution patterns based on monitored weather conditions.

SUMMARY OF THE PRESENT INVENTION

To address the shortcomings presented in the prior art, the present invention provides a system and method which combines field mapping and control software to effectively manage end gun parameters to adjust for changes in weather conditions and positional/terrain changes.

According to a first preferred embodiment, the present invention preferably provides a system which monitors a mapped set of boundaries and preferably receives data regarding a variety of weather factors including wind monitoring (speed, direction, averages, and gusts) and preferably makes adjustments to the system (i.e. water pressure, end gun parameters and/or system travel speed) to adjust and modify the shape of a desired distribution area.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
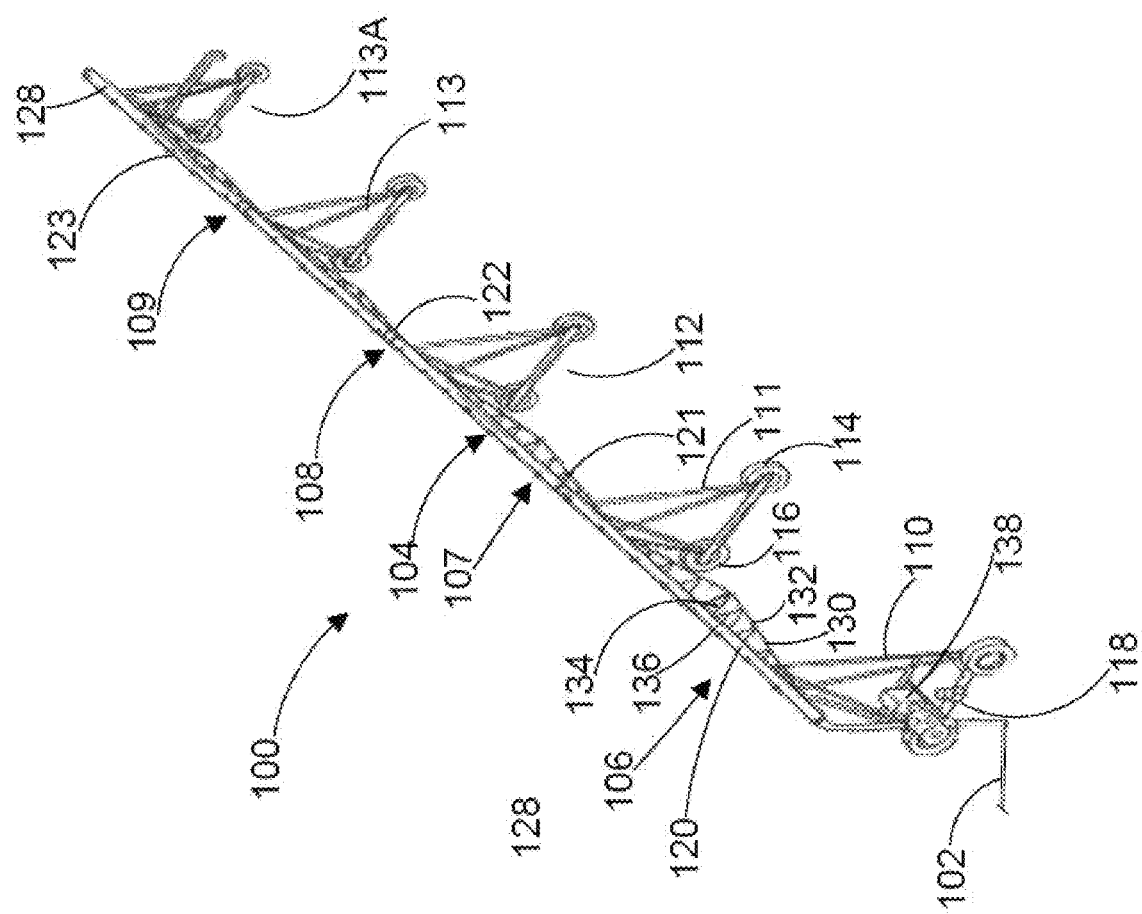
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emittercoupled logic (ECL), polymer technologies (e.g., silicon-conjugated polymer and metal-conjugated polymer-metal structure), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

As shown in FIG. 1, exemplary system 100 includes a pipeline 102 and a main section assembly 104 (irrigation section assembly) coupled (e.g., connected) to the pipeline 102. The pipeline 102 has access to a well, a water repository (e.g., water tank), or other fluid source, to furnish water to the irrigation system 100. For instance, the pipeline 102 may be pressurized to facilitate the transfer of water from the water source to main section assembly 104. The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like.

The main section assembly 104 includes a number of interconnected spans 106, 107, 108, 109 (e.g., irrigation spans) supported by one or more tower structures 110, 111, 112, 113, 113A. The tower structures 110, 111, 112, 113, 113A may be any tower configuration known in the art to adequately support the conduits (e.g., water pipe sections) described herein. It is understood that the section assembly 104 may include any number of spans and tower structures. The tower structures 110, 111, 112, 113, 113A each include wheels 114, 116, to assist in traversing the irrigation system 100 (e.g., allowing the main section assembly 104 to traverse) about a cultivation area (e.g., field). In an implementation, the wheels 114, 116 may be driven by a suitable drive unit 118 (e.g., drive motor), or the like, to assist in traversing the system 100 about the specified area. For example, the tower structure 110 may include a drive unit 118 to propel the irrigation system 100 through the cultivation area. It is understood that while only two wheels 114, 116 are shown coupled to each tower structure 110, 111, 112, 113, 113A, each tower structure 110, 111, 112, 113, 113A may include additional wheels according to the design requirements of the irrigation system 100.

As shown in FIG. 1, each span 106, 107, 108, 109 includes a respective conduit 120, 121, 122, 123 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122, 123 may be coupled to one another to allow fluid communication between each conduit. In an implementation, the conduits 120, 121, 122, 123 may be supported by truss-type framework structures 124, 125, 126. Thus, the main fluid displacement device may be configured to displace applicant through the conduits 120, 121, 122, 123. As further shown in FIG. 1, the irrigation system 100 also includes a cantilevered boom structure 128 that extends outwardly from the end tower structure 112. As additionally shown, multiple truss rods 130 are tensioned between the tower structures 110, 111, 112. In implementations, the truss rods 130 include truss rod segments 132 (i.e., shaft components) extending longitudinally between the truss-type framework structures 124, 125, 126. The truss rod segments 132 may be arranged end-to-end and separated using spreaders 134 suspended from the respective span 106, 107, 108, 109. For example, the spreaders 134 may be suspended from the respective span 106, 107, 108, 109 using, for example, diagonals 136.

Figure 2:
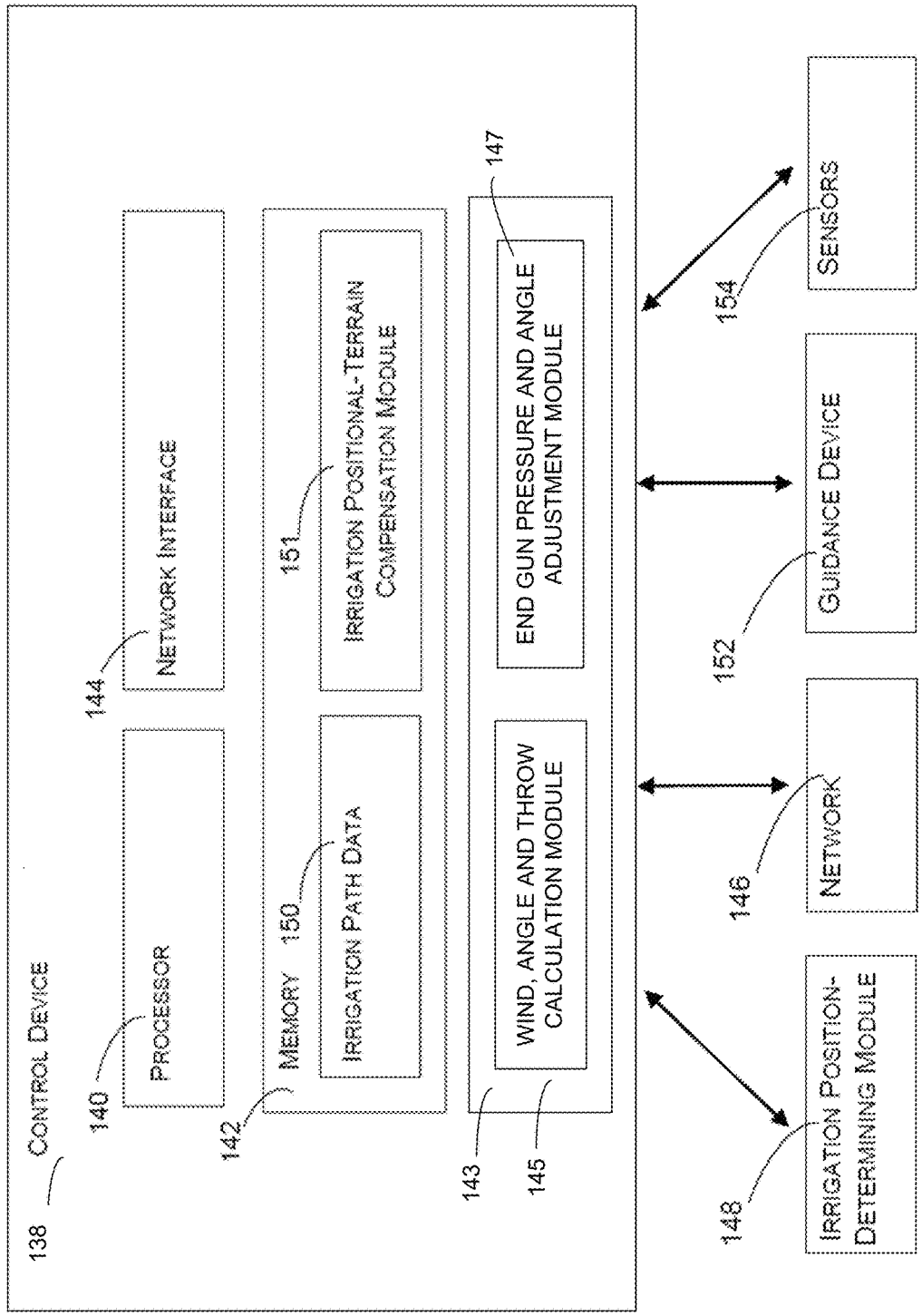
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a module 151 and a network interface 144. The processor 140 provides processing functionality for the control device 138 and may include any number of processors, microcontrollers, or other processing systems. The processor 140 may execute one or more software programs that implement techniques described herein. The memory 142 is an example of tangible computer-readable media that provides storage functionality to store various data associated with the operation of the server 102 (client device 104), such as the software program and code segments mentioned above, or other data to instruct the processor 140 and other elements of the control device 138 to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

As further shown, a preferred embodiment of the present invention preferably further includes a Wind, Angle and Throw Calculation Module 145 ("Throw Module" 145) and an End Gun Pressure and Angle Adjustment Module 147 ("Adjustment Module" 147). According to a preferred embodiment of the present invention, the Throw Module 145 preferably receives field mapping data, water pressure and weather data which may preferably include wind speed, wind direction, humidity and barometric pressure from the sensor systems as discussed further below. From these data inputs, the Throw Module 145 preferably calculates the length of the throw (alternatively referred to as the "throw" or "end gun reach") for the end gun for a range of water pressures and end gun settings/parameters (defined herein to include angles of travel, trajectory, nozzle/sprinkler settings and the like) which the end gun is programmed to execute. Preferably, the Throw Module 145 is programmed to receive continual updates of both weather conditions and water pressure levels so that it may dynamically calculate and update throw calculations in real-time as the irrigation system executes a given watering plan. According to a further preferred embodiment, the Throw Module 145 preferably continually feeds the results of its calculations to Adjustment Module 147. Such calculations may further include factors and inputs such as safety zones, guidance tower speed, max ET ratio, minimum Arc Radius, full or partial circle, max/min trajectories and start/end angles.

Adjustment Module 147 is preferably linked to the control systems (i.e. transducers 326, 328, 329 discussed further below) to control and regulate water pressure including being linked to any pressure boosting systems. Further, Adjustment Module 147 is preferably further linked to systems which control and adjust end gun settings/parameters. Additionally, Adjustment Module 147 is preferably further linked to and receives positioning information from the irrigation positioning module 148 and other mapping systems so that Adjustment Module 147 may calculate the optimal throw desired for the end gun. Preferably, based on the dynamically updated throw calculations from the Throw Module 145, Adjustment Module 147 may preferably independently and dynamically adjust the water pressure and/or end gun settings/parameters (including angles of travel, trajectory and nozzle/sprinkler settings) so that the end gun reach stays within the boundaries of the given area to be irrigated.

According to further aspects of the present invention, as the irrigation system is executing an irrigation plan to apply water within a given set of boundaries, Adjustment Module 147 may preferably receive instantaneous updates regarding the end gun reach and make adjustments accordingly. For example, on a windy day Adjustment Module 147 may increase water pressure (and/or change the end gun settings/parameters) when the end gun is projecting water against the wind direction. Alternatively, the Adjustment Module 147 may operate to decrease water pressure (and/or change the end gun settings/parameters) when the end gun is projecting water with the direction of the wind. According to a further preferred embodiment, Adjustment Module 147 may preferably likewise take into account changes in the mapped boundaries and location of the irrigation system as it moves to adjust the throw pattern of the end gun.

Figure 3:
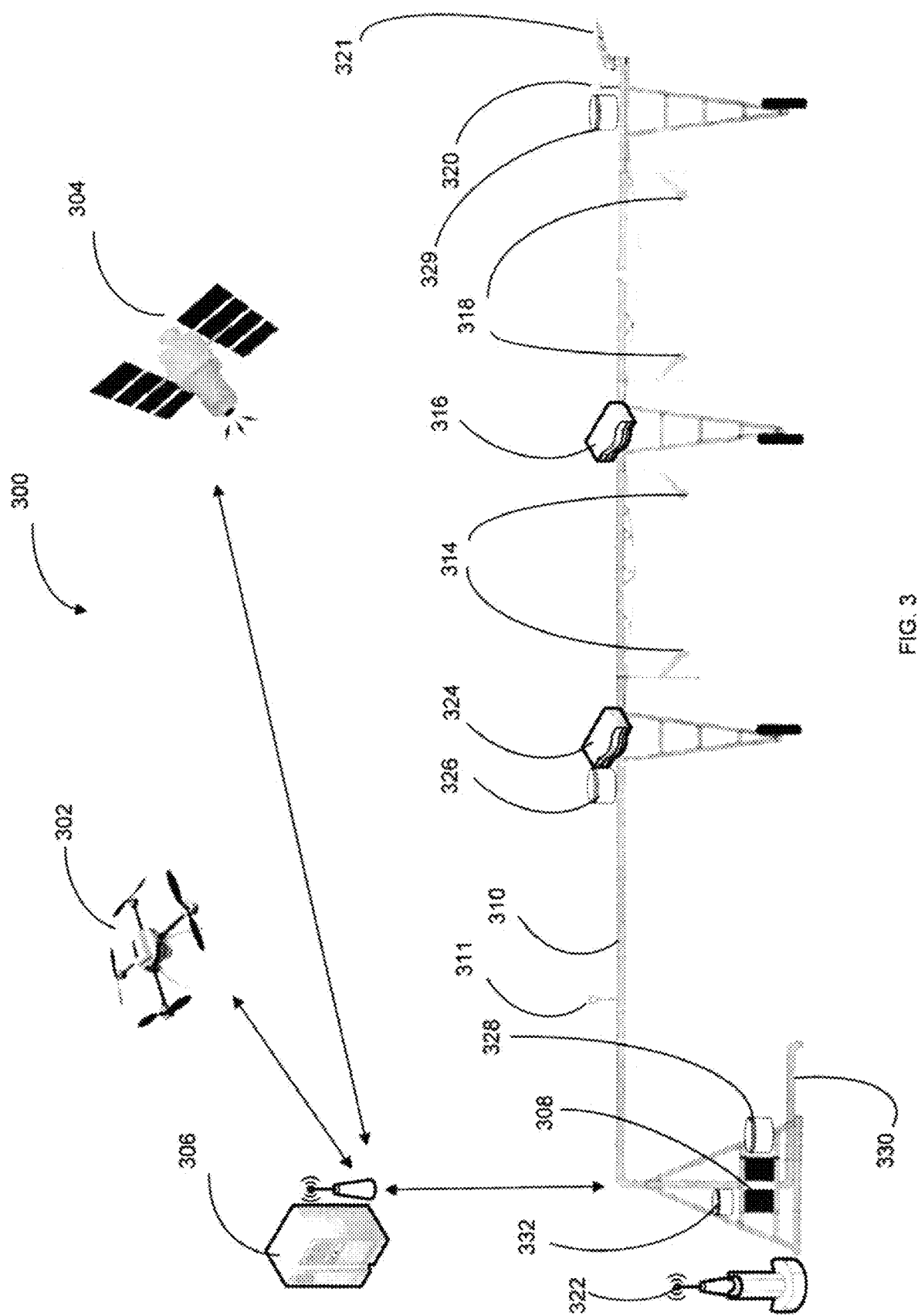
FIG. 3 shows a block diagram in accordance with further preferred embodiment of the present invention.

With reference now to FIG. 3, an exemplary system incorporating aspects of the present invention shall now be further discussed. As further shown, an exemplary irrigation system may include transducers 326, 328, 329 which are provided to control and regulate water pressure to the end gun 321 and other sprinkler heads. Further the system may preferably include drive units 316, 324 which are preferably programmed to monitor and control portions of the irrigation unit drive system. Further, the system of the present invention may preferably further include elements such as a GPS receiver 320 for receiving positional data and a flow meter 332 for monitoring water flow in the system. Still further, a system of the present invention may further include indirect crop sensors 314, 318 which preferably may include moisture sensors to determine the moisture levels in a given area of soil. Additionally, the sensors 314, 318 may further include optics to allow for the detection of crop type, stage of grown, health, presence of disease, rate of growth and the like. Still further, the system may include ground sensors 330. Still further, the detection system may further include a weather station 322 or the like which is able to measure weather features such as humidity, wind speed, wind direction, pressure, precipitation, temperature and the like. Still further, the system may preferably further include a wireless transceiver/router 311 for receiving and transmitting signals between system elements.

In operation, the system of the present invention may also preferably calculate and adjust the movement of the irrigation drive system to compensate for changes in the throw/distribution patterns calculated from the weather data and/or positional information. For example, the irrigation system of the present invention may preferably calculate and execute a first water distribution and/or travel pattern based on a first detected set of weather data and/or field dimensions. Thereafter, based on updated weather data and/or field dimensions, the system may make adjustments to the first water distribution/travel pattern to create a second water distribution and/or travel pattern. Accordingly, the system may determine to travel closer to or further from a first boundary based on detected weather conditions such as a given wind pattern (i.e. speed and/or direction). Further, as discussed further herein, the system of the present invention may change the water distribution pattern by controlling and changing the parameters of the end gun alone or in conjunction with other irrigation system parameters. Still further, the system of the present invention may simultaneously change multiple parameters of the irrigation system including the water pressure, travel speed, travel pattern and/or end gun settings/parameters to create a desired water distribution pattern.

Preferably, the data collected by the detectors and sensors connected to the span 310 are forwarded to a main control panel 308 which preferably includes: a CPU, memory, and processing software to receive and process collected data (including Throw Module 145 as discussed above with respect to FIG. 2), and one or more elements of control device 138 (including Adjustment Module 147 as discussed above with respect to FIG. 2). According to alternative preferred embodiments, any one of the processes discussed above with respect to the main control panel 308 may alternatively be performed on a remote server 306 with any data and/or control signals transmitted between the main control panel 308 and the remote server 306. Still further, the system may preferably further include a remote sensing element such as a sensor suite located on an unmanned aerial vehicle 302 (UAV), satellite 304 or other high altitude monitoring system which may preferably provide weather and other data to the remote server 306 and/or to the control panel 308.

As discussed above, the control panel 308 of the present invention preferably may monitor the system location in relation to a mapped set of boundaries in coordination with a field specific program. During operation, the control panel 308 may preferably receive data regarding field dimensions, changes in the irrigation plan/pattern, and/or data regarding weather factors (such as wind speed, direction, averages, and gusts) and preferably makes adjustments to the system (i.e. water pressure, end gun settings/parameters, system travel speed/direction) to adjust and modify the shape of the desired distribution area. Accordingly, the control panel 308 may preferably monitor the irrigation program and the location of the end gun to adjust system/end gun settings in response to sensor inputs and thereby create a desired distribution pattern/area. According to further preferred embodiment, the system of the present invention may preferably further calculate adjustments to the system based on other factors including: droplet size, applicant type, height of nozzle from the ground, speed of irrigation system travel and the like. Further, the system of the present invention may preferably further adjust a given designed distribution pattern based on additional factors such as: rate of rain fall, pH of rain fall, sunlight levels, rates of temperature change and the like.

While the above descriptions regarding the present invention contain much specificity, these should not be construed as limitations on the scope, but rather as examples. Many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method of controlling an irrigation system in response to detected conditions, wherein the method comprises:
    receiving the mapped boundaries of a field to be irrigated;
    receiving system data, wherein the system data comprises: location data; environmental data; and irrigation machine condition data;
    receiving route data;
    receiving endgun parameter data;
    analyzing the received system data, route data and endgun parameter data;
    calculating the throw distances for the endgun based on the system data, route data and endgun parameter data;
    comparing the calculated throw distances to the mapped field boundaries based on received route data to determine where the throw distances will exceed the mapped field boundaries;
    adjusting one or more endgun parameters or at least one system parameter to lower the calculated throw distances so that the spray from the endgun lands substantially within the mapped field boundaries;
    setting an initial set of endgun parameters;
    executing an irrigation plan;
    receiving and updating system, route and endgun parameter data while the irrigation plan is executed;
    monitoring the execution of the irrigation plan and the location of the endgun during the execution of the irrigation plan; and
    adjusting system and endgun parameters in response updated system, route and endgun parameter data to create a desired distribution pattern which falls within the mapped field boundaries.

2. The method of claim 1, wherein the one or more parameters includes a parameter selected from the group of parameters comprising: endgun parameters and system travel speed.

3. The method of claim 1, wherein the one or more parameters comprises a parameter selected from the group of parameters comprising: applicant mixture, applicant type and direction of travel.

4. The method of claim 1, wherein the endgun parameters are selected from the group of parameters comprising: nozzle droplet size, start/end angles, nozzle valve opening pressure, and nozzle settings.

5. The method of claim 4, wherein the system calculates all endgun parameters for the entirety of the irrigation plan prior to irrigation.

6. The method of claim 5, wherein the wherein the system continually receives environmental data, system condition data, and location data during irrigation operations.

7. The method of claim 6, wherein the system dynamically changes endgun parameters as environmental data, system condition data, and location data are received during irrigation operations.

8. The method of claim 7, wherein the environmental data is further comprised of data selected from the group of data comprising: rate of rain fall, pH of rain fall, sunlight levels, and rates of temperature change.

9. The method of claim 8, wherein the system increases water pressure based on a detected wind direction.

10. The method of claim 9, wherein the location data comprises: direction of travel, rate of travel, slope of field, and safety zones.

11. The method of claim 10, wherein at least one endgun parameter is adjusted based on the detected slope of the field to be irrigated.

* * * * *